US006168344B1

(12) United States Patent
Aguirre, Jr.

(10) Patent No.: US 6,168,344 B1
(45) Date of Patent: Jan. 2, 2001

(54) BULL ROPE SAFETY RELEASE

(76) Inventor: Hector Aguirre, Jr., 211 Magnolia, El Paso, TX (US) 79901

( * ) Notice: Under 35 U.S.C. 154(b), the term of this patent shall be extended for 0 days.

(21) Appl. No.: 09/146,797

(22) Filed: Sep. 3, 1998

(51) Int. Cl.[7] .................................................. B25G 3/18
(52) U.S. Cl. .................................. 403/325; 403/DIG. 4; 403/322.4
(58) Field of Search .................. 403/321, 322.1, 403/322.3, 322.4, 325, DIG. 4; 24/115 F, 611, 633, 641, 606; 119/769, 771, 772, 774, 776, 778

(56) References Cited

U.S. PATENT DOCUMENTS

| | | | |
|---|---|---|---|
| 793,874 | * | 7/1905 | Eklund ................................. 24/606 |
| 796,490 | * | 8/1905 | Baker ................................. 24/606 |
| 4,909,658 | * | 3/1990 | Townsend ............................. 403/325 |
| 5,771,668 | * | 6/1998 | Younger ................................. 54/1 |
| 5,815,895 | * | 10/1998 | Carlson et al. ........................ 24/603 |
| 5,949,339 | * | 9/1999 | Ettinger et al. ................... 340/573.1 |

* cited by examiner

*Primary Examiner*—Lynne H. Browne
(74) *Attorney, Agent, or Firm*—Arthur I. Navarro

(57) ABSTRACT

A bull rope safety release includes two shank pieces which can be joined together to keep a bull rope firmly in place over the body of a bucking bull or bronco. The safety release includes two D-rings which are connected to the bull rope and hold the safety release in place. A locking lever in one of the shank pieces has a hook which engages a brace bar in the other shank piece. The other end of the locking lever is connected to a pull cord with a wire or other means. A brace member is centrally disposed inside the body of the first shank and provides a support about which the locking lever rotates when the pull cord is yanked. A second lever is provided inside the second shank piece and can be likewise yanked to disengage the two shank pieces from one another.

9 Claims, 6 Drawing Sheets

BULL ROPE SAFETY RELEASE

TECHNICAL FIELD

The invention relates to a safety device for bull and bronco riders.

BACKGROUND OF THE INVENTION

Bull and bare back bronco riding are popular entertainment events both in the United States and throughout North America. At the same time riding a bull or bare back bronco can be very dangerous sport. Oftentimes a rider will be thrown from the bucking animal and be exposed to great physical harm and/or death. For that reason a variety of safety precautions are often observed by the rider.

For example, in riding a bull the rider uses a bull rope which is attached under and over the body of the beast just behind its front legs. The bull rope comes together on top of the animal and is held by the rider during the ride. Typically, a hand hold is fixed to the bull rope through rings which, in turn, hold the bull rope in place to the animal. The hand hold is then wrapped about one hand of the rider who grips the strap as tightly as possible. When the bull is let out of the chute the rider holds on to the beast by a single hand which grasps the strap in place.

Often the rider is successful and maintaining a mount on the bull for a predetermined amount of time such as 8 seconds. After the predetermined amount of time the rider must then dismount the beast. The rider may also be thrown by the bucking animal during the ride resulting in a premature dismount. In either case it is important that the rider be able to free his hand from the strap to dismount the bull or bronco.

A prior art bull rope release is disclosed in U.S. Pat. No. 4,909,658 (the '658 patent). The '658 patent discloses a release with a relatively flat base having an attached ring latch with an open mouth at one end and a lock shoulder at the other. The release mechanism of the '658 patent uses a pull cord connected to a release latch arm. The bull rope release of the '658 patent uses a single release which may present problems for the rider if he is unable to find the release latch while being bucked off the animal. Thus, with the bull rope release of the '658 patent, the rider must grasp the single release within seconds or face possible serious injury.

As such, there is a need for a device that provides more than one release mechanism that will permit the rider to free himself from the bucking animal and avoid possible serious injury.

SUMMARY OF THE INVENTION

It is an object of the invention to provide a bull rope safety release with more than one release mechanism that minimizes the risk to the rider when dismounting or freeing himself from a bucking bull or bronco.

In one embodiment, a bull rope safety release is disclosed that use two shank pieces that interlock with one another. One of the shank pieces contains a bar brace which extends horizontally through the body of the shank and is fixed within the shank along a line perpendicular to an axis of the shank. A second shank piece has a locking lever which extends through the opening of the second shank piece and is braced within the shank but configured for rotational action about the brace. When the shank pieces are joined together, the locking lever within the second shank piece extends through an opening of the first shank piece and engages the bar brace within the first piece in such a way that the locking lever keeps both shank pieces together. The locking lever extends through a second opening of the second shank piece and is preferably coupled to a first pull cord which can be pulled to cause the locking lever to rotate about a second brace bar in the second shank piece. The rotating action of the locking lever causes it to be disengaged from the first brace bar within the first shank piece and allows the two shank pieces to separate.

A second lever extends substantially through the first shank piece and contains a trip mechanism at one end arranged in close proximity to the locking lever. A second end of the second lever extends through a hole of the first shank piece and is affixed to a second pull cord. A tug or pull on the second pull cord causes the second lever to release the locking lever about the brace bar in the first shank piece providing a second release means for separating the two shank pieces from one another.

The safety release has two D-rings which can be used to attach it to a bull rope. Preferably the release is braided close to the hand hold of the bull rope which allows easy separation of the safety release into two pieces. When the rider pulls either end of the safety release it separates the bull rope in two pieces allowing the rider to step away from the bull or bronco and get to safety. The safety release may also be sewn to the bare back rigging or connected to a D-ring in the bare back rigging. In this way either the rider or his pick up man can separate the safety release by pulling either one of the pull cords which in turn separates the bare back rigging into two pieces.

For a better understand of the invention including specific embodiments and advantages reference is made to the following detailed description taken in conjunction with the appended drawings.

BRIEF DESCRIPTION OF THE DRAWINGS

Corresponding numerals in the figures refer to corresponding parts unless otherwise indicated.

DETAILED DESCRIPTION OF PREFERRED EMBODIMENT

Figure 1:
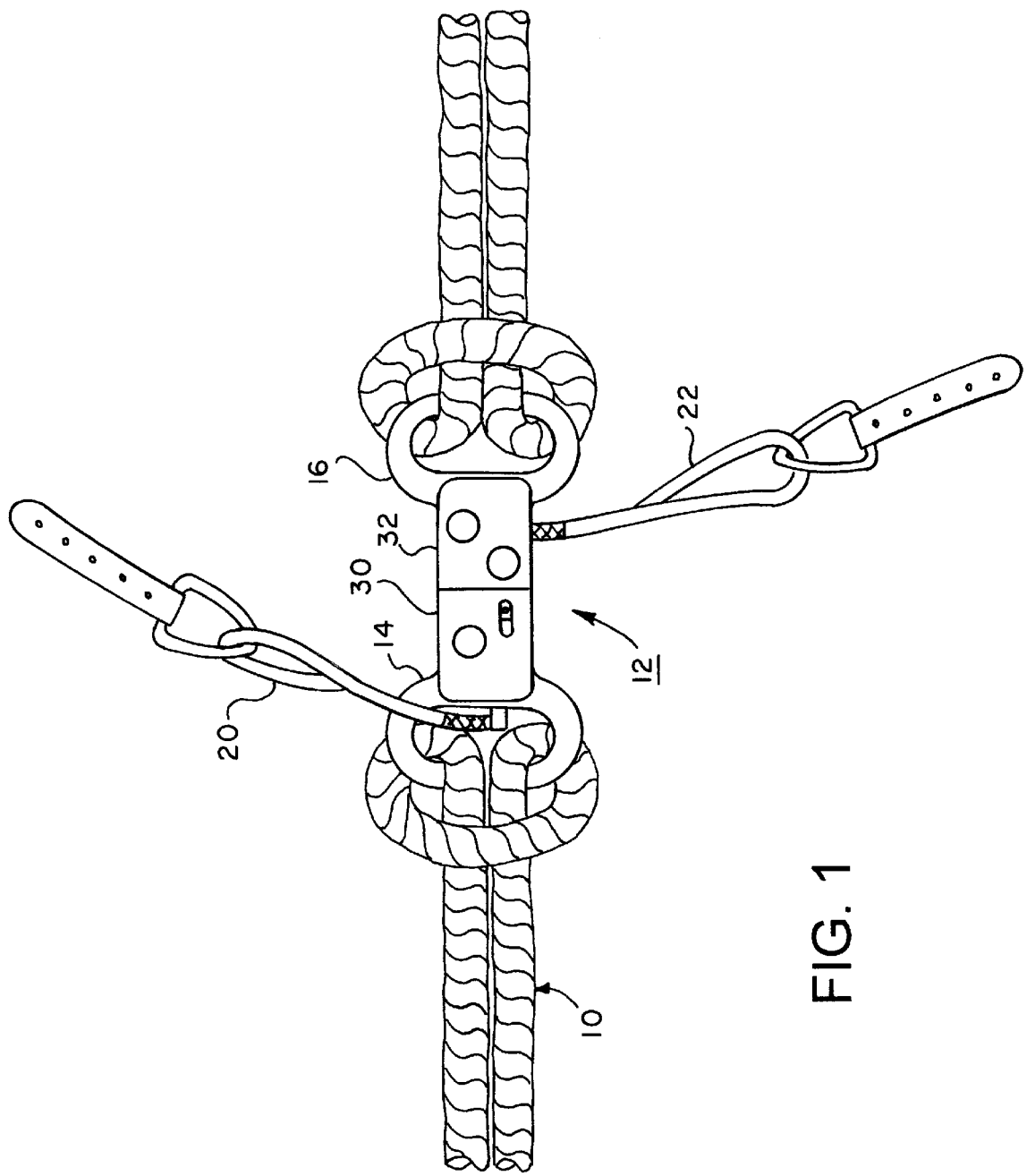
FIG. 1 illustrates the safety release of the invention coupled to a bull rope.

Turning first to FIG. 1, therein is shown the safety release 12 braided to a bull rope 10. As shown, the safety release 12 has two D-rings 14 and 16 through which the ends of the bull rope 10 are inserted and tied to the safety release 12. Preferably the safety release 12 is braided to the bull rope 10 close to the hand hold (not shown in FIG. 1) of the bull rope 10. The D-rings 14 and 16 may be shaped and sized in a plurality of configurations as long as they are suitable to accept a standard size bull rope 10 of the type widely used in the rodeo industry. In one embodiment the D-rings 14 and 16 are approximately 2" in length, ¾" in width and a ¼" thick.

The safety release 12 has two pull cords 20 and 22 coupled thereto which permit separation of the safety release 12 into its two shank pieces 30 and 32. The pull cords 20 can vary but in general constitute a strap like member flexible and sturdy enough to accommodate a sturdy yank by the rider or pick up man. The left shank piece 30 and right shank piece 32 of the safety release 12 are joined to each other and to the bull rope 10 when strapped to a bull or bare back bronco. Preferably either pull cord 20 or 22 is accessible to the rider or pick up man.

Figure 2:
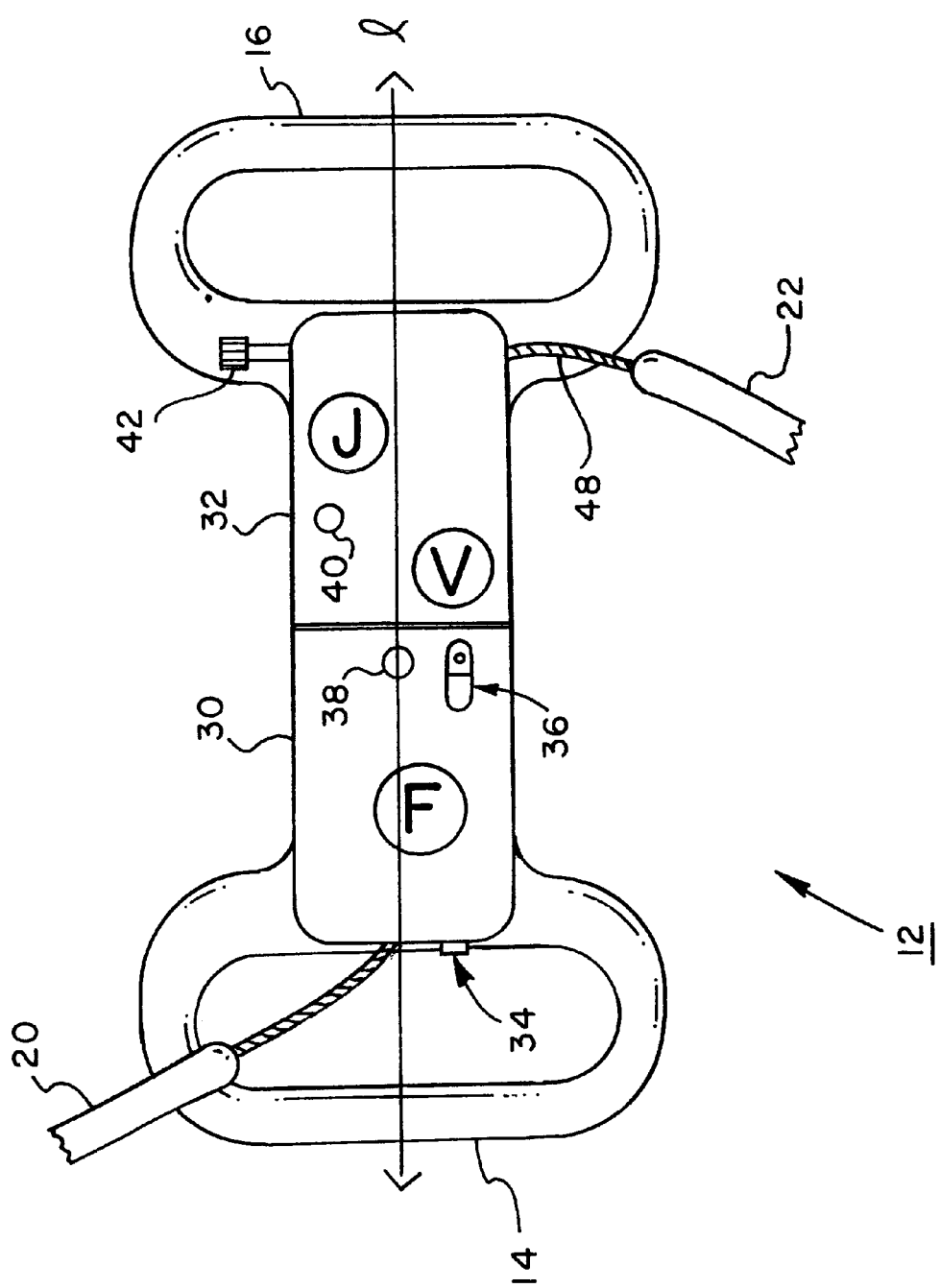
FIG. 2 is a top face view of the safety release with both shank pieces joined.

Turning next to FIG. 2, a top view of the safety release 12 with shank pieces 30 and 32 joined together is shown. The shank pieces 30 and 32 form rectangular shaped enclosure in which the locking mechanisms are contained. The left shank piece 30 is coupled to D-ring 14 and includes a lever 34 which extends inside of the shank piece 30 along a path parallel to axis I. The lever 34 provides a first latching means that keeps the shank pieces 30 and 32 together. The shank piece 30 includes a stop hole 36 which is used to guide the motion of lever 34 within the top half shank piece 30 along axis I. The shank 30 includes a brace bar 38 which functions to enable the latching function of the safety release 12 as described herein.

Likewise the right shank piece 32 has a brace bar 40 which extends perpendicular to axis I inside the body of the shank piece 32. A securer 42 is used attached the pull rope 22 with wire 48. It should be understood that the pull rope 22 may be coupled to the safety release 12 with other means as well.

Figure 3:
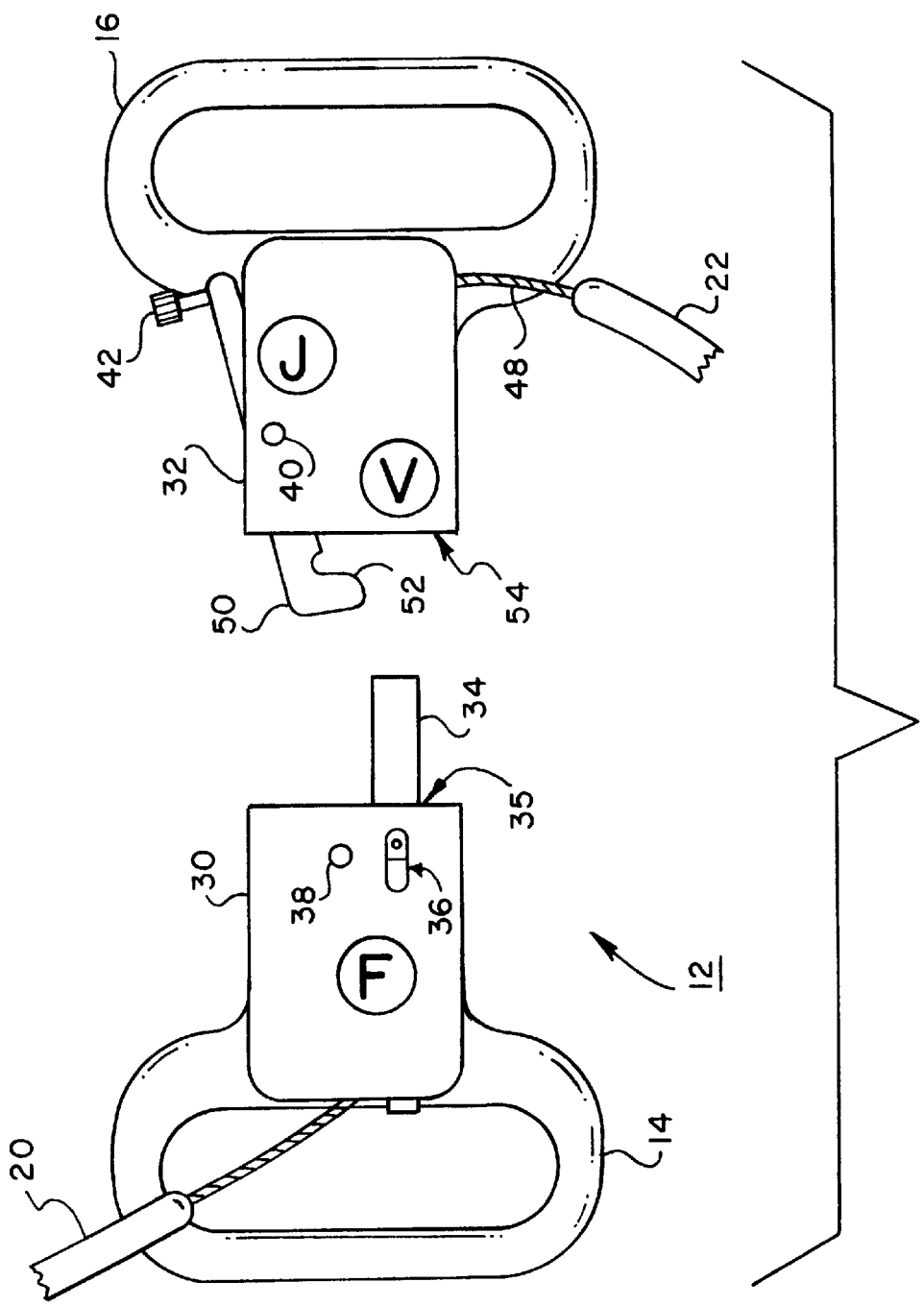
FIG. 3 illustrates the bull rope safety release with the two shank pieces separated.

Turning next to FIG. 3, the safety release 12 is shown with the two shank pieces 30 and 32 separated from one another. The locking lever 50 extends out through end 54 of the shank piece 32. The locking lever 50 provides a second latching means that keeps the shank pieces 30 and 32 together. The securer 42 and wire 48 move generally in a direction perpendicular to axis I. As shown, the locking lever 50 has a hook end 52 or latch which facilitates the latching action of the lever 50 about brace bar 38 in the shank piece 30. A better understanding of the latching operation of locking lever 50 can be had by reference to FIG. 4.

Figure 4:
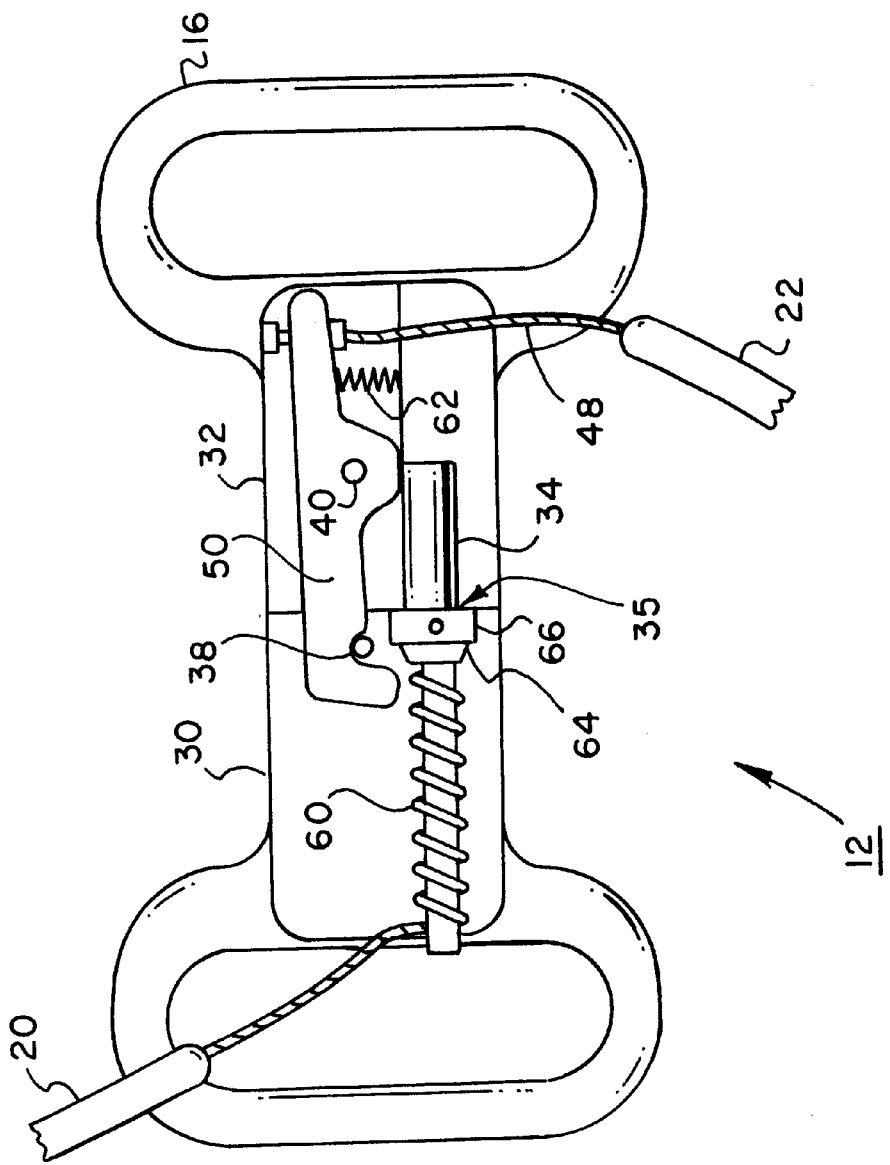
FIG. 4 is an internal view of the safety release illustrating the arrangement of levers and brace bars.

FIG. 4 illustrates that the locking lever 50 engages with the brace bar 38 inside the left shank piece 30 when the shank pieces 30 and 32 are joined together. As shown, the lever 34 extends through the left shank piece 30 through opening 35 and fits within a cavity 70 inside the right shank piece 32 to help secure the shank pieces 30 and 32 firmly to each other. A return spring 60 is operably coupled about a portion of the lever 34 and provides a mechanism that operates the motion of the lever 34 in a direction parallel to axis I. Likewise, a return spring 62 operates the locking lever 50 within the shank piece 32 about the brace bar 40 extending through the body of the right shank piece 32.

Figure 5:
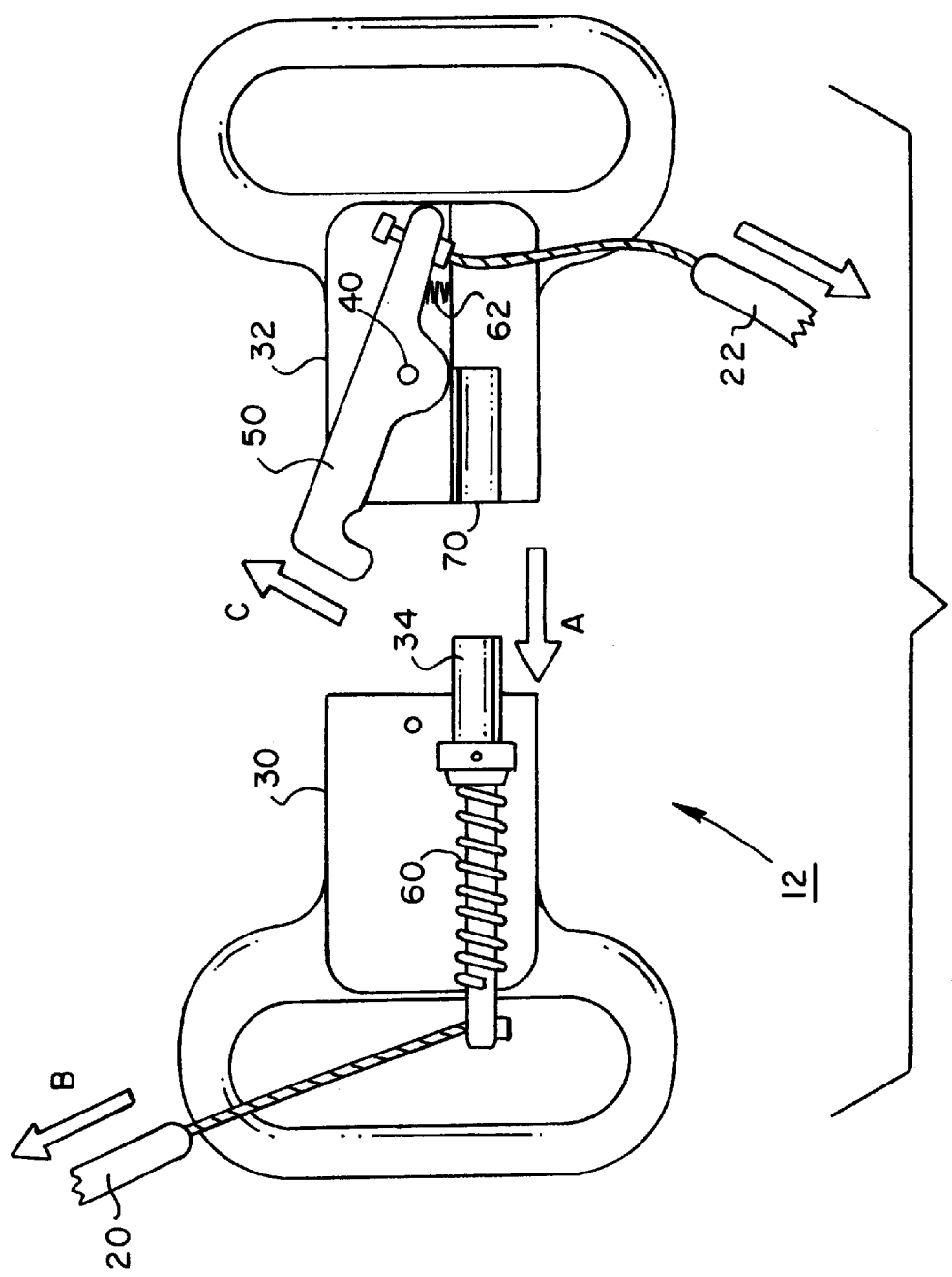
FIG. 5 illustrates the motion of the locking levers when the bull safety release is separated.

As shown, the lever 34 has a flange 66 which is sized and fitted to engage the latch lever 52. The flange 66 has a tapering end 64 predisposed to lift the locking lever 50 up when the pull rope 20 is yanked outward from the safety release 12. Together, the flange 66 and tapering end 64 form a tripping mechanism that releases the locking lever 50 when the pull cord 20 is pulled by a rider or a pick up man. This feature of the safety release is illustrated in FIG. 5 wherein the lever 34 moves in the direction of the arrow A when the pull 20 is yanked outwardly from the left shank piece 30 in the direction of arrow B.

A cavity 70 is provided in the shank piece 32 to accommodate the insertion of the lever 34 when the half shank pieces 30 and 32 are joined together. The pull 22 causes the locking lever 50 to rotate up in the direction of arrow C causing the lever 50 to pivot about the brace bar 40 fixed inside the body of shank piece 32. Preferably, the safety release 12 is configured so that a yank on either pull cord 20 or 22 causes the separation of the shank pieces 30 and 32 from one another. By locating the safety release 12 within a comfortable distance from the rider's grasp (or the rider's pick up man), the safety release 12 provides a dual release mechanism which can be used to disengage the bull rope 10 from the body of a bucking bull or bronco.

Figure 6:
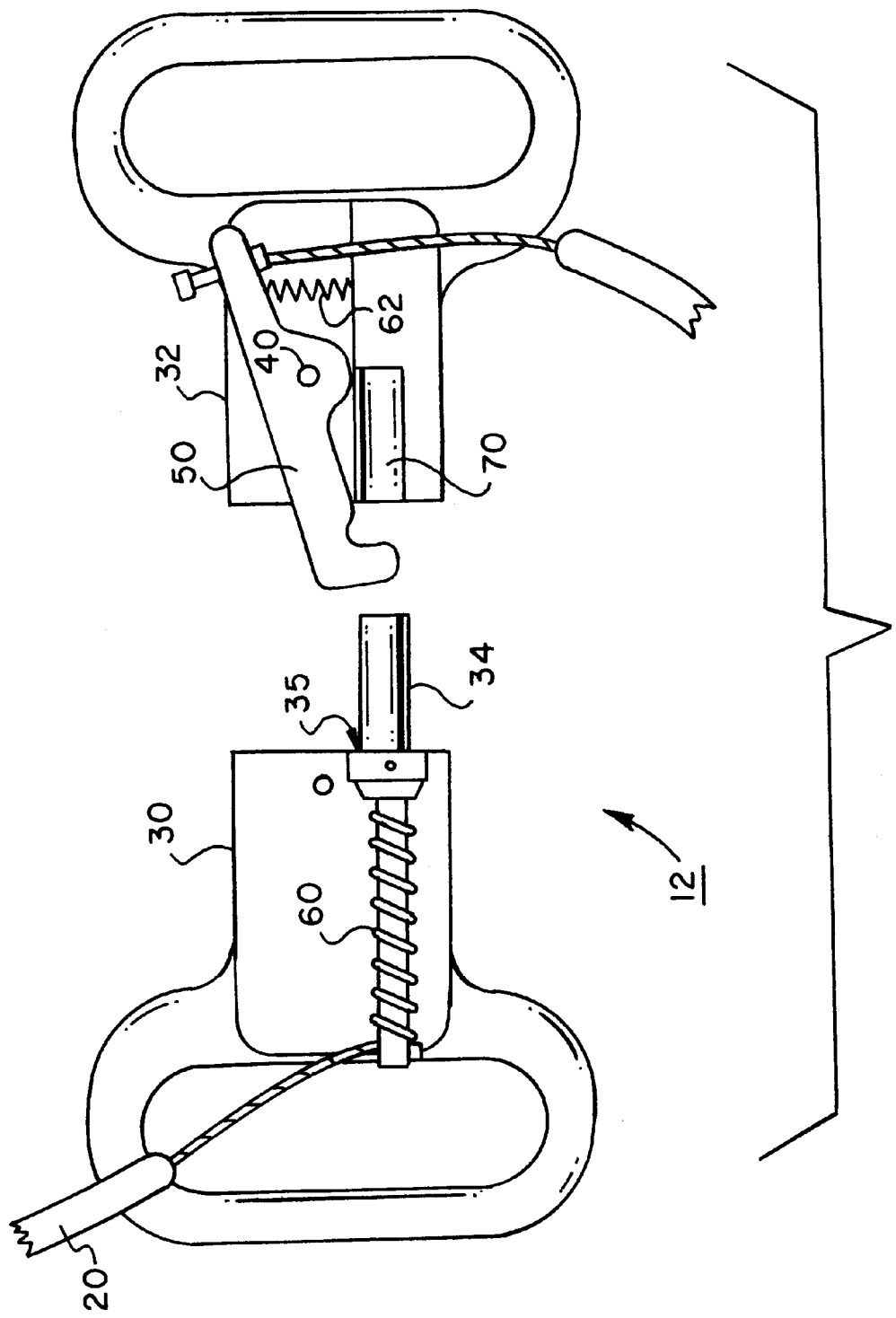
FIG. 6 shows the safety release after separation and the position of the locking lever in the return configuration.

FIG. 6 illustrates the return action of the lever 34 and locking lever 50 after the shank pieces 30 and 32 have been separated from one another. As shown, the return spring 60 has caused the lever 34 to spring back to its original position before the pull cord 20 was yanked. Likewise, the locking lever 50 has rotated about the brace bar 40 due to the force exerted by the return spring 62 within the shank piece 32. The shank pieces 30 and 32 are now ready to be rejoined by pushing them together so that the lever 34 fits within cavity 70 and the hook end 52 of locking lever 50 is engaged about the brace bar 38 within shank piece 30.

While the invention has been described in conjunction with a preferred embodiment, it should be understood that modifications will become apparent to those of ordinary skill in the art, and that such modifications are intended to be included within the scope of the invention and the following claims.

What is claimed is:

1. A bull rope release comprising:

a first shank piece forming a substantially rectangular enclosure with a cavity therein;

a first brace bar extending through said enclosure and firmly fixed within said first shank piece;

a first lever extending through said first shank piece and configured to pivot about said first brace bar, said first lever having a latch at one end and another end with a securer;

a second shank piece forming a substantially rectangular enclosure and having a second brace bar firmly fixed within;

a second lever extending through said second shank piece, said second lever having one end shaped to be inserted within said cavity and another end with a securer, wherein said latch extends over said second brace bar when said first shank piece and said second shank piece are in contact with each other; and a first pull cord coupled to said securer of said first lever and configured so that a yank of said first pull cord causes said first lever to rotate about said first brace bar and away from said second brace bar; and a second pull cord coupled to said securer of said second lever.

2. The bull rope release according to claim 1 further comprising a return spring operably coupled to a portion of said second lever to control the back and forth motion of said second lever about an axis of said second shank piece.

3. The bull rope release according to claim 1 further comprising a stop carved out within said second shank piece and arranged to limit the back and forth motion of said second lever about an axis of said second shank piece.

4. The bull rope release according to claim 1 further comprising first and second D-rings coupled to said first and second shank pieces, respectively.

5. The bull rope release according to claim 1 wherein said triggering mechanism comprises a flange with a tapered end that engages said latch of said first lever when said second cord is yanked.

6. A safety release comprising:

a first shank piece;

a second shank piece;

a first latch means contained within said first shank piece, said first latch means having first and second ends;

a second latch means contained within said second shank piece, said second latch means having first and second ends;

first and second pull cords coupled to corresponding first ends of said first and second latch means; and wherein each of said first and second latch means are configured to keep said first and second shank pieces together in one configuration and released in a second configuration, said second configuration resulting when either one of said first and second pull cords are yanked away from either one of said first and second shank pieces.

7. The safety release according to claim 6 further comprising a return spring for controlling the back and forth motion of said second latch means about an axis of said second shank piece.

8. The safety release according to claim 6 further comprising a stop carved out within said second shank piece and arranged to limit the back and forth motion of said second latch about an axis of said second shank piece.

9. The safety release according to claim 6 further comprising a triggering mechanism configured to release said first latch means when either of said first or second pull cords is yanked.

* * * * *